(No Model.)  F. W. ANDRÉE.  2 Sheets—Sheet 1.

FLOUR SIFTING MACHINE.

No. 296,716.  Patented Apr. 15, 1884.

WITNESSES:  INVENTOR
  Franz Wilhelm Andrée
  BY Wm H Lotz
  ATTORNEY (No Model.) 2 Sheets—Sheet 2.

F. W. ANDRÉE.
FLOUR SIFTING MACHINE.

No. 296,716. Patented Apr. 15, 1884.

WITNESSES:
Adam Gro. White
Louis Nolting

INVENTOR
Franz Wilhelm Andrée
BY Wm H Lotz
ATTORNEY

UNITED STATES PATENT OFFICE.

FRANZ WILHELM ANDRÉE, OF CHICAGO, ILLINOIS.

FLOUR-SIFTING MACHINE.

SPECIFICATION forming part of Letters Patent No. 296,716, dated April 15, 1884.

Application filed August 2, 1883. (No model.)

*To all whom it may concern:*

Be it known that I, FRANZ WILHELM ANDRÉE, a subject of the Emperor of Germany, residing at Chicago, in the county of Cook and State of Illinois, have invented certain new and useful Improvements in Flour-Sifting Machines, of which the following is a specification, reference being had therein to the accompanying drawings.

My invention relates to an improved flour-sifting machine; and the object in view is to so construct such a machine that the crushed grain will be thoroughly sifted, the coarser and finer particles being separated and discharged through different outlets.

The invention consists in certain novel constructions and combinations of parts, all as will be hereinafter fully described and specifically claimed.

For the better understanding of the invention, reference will be made to the accompanying drawings, which form part of this specification, and in which—

Figure 1:
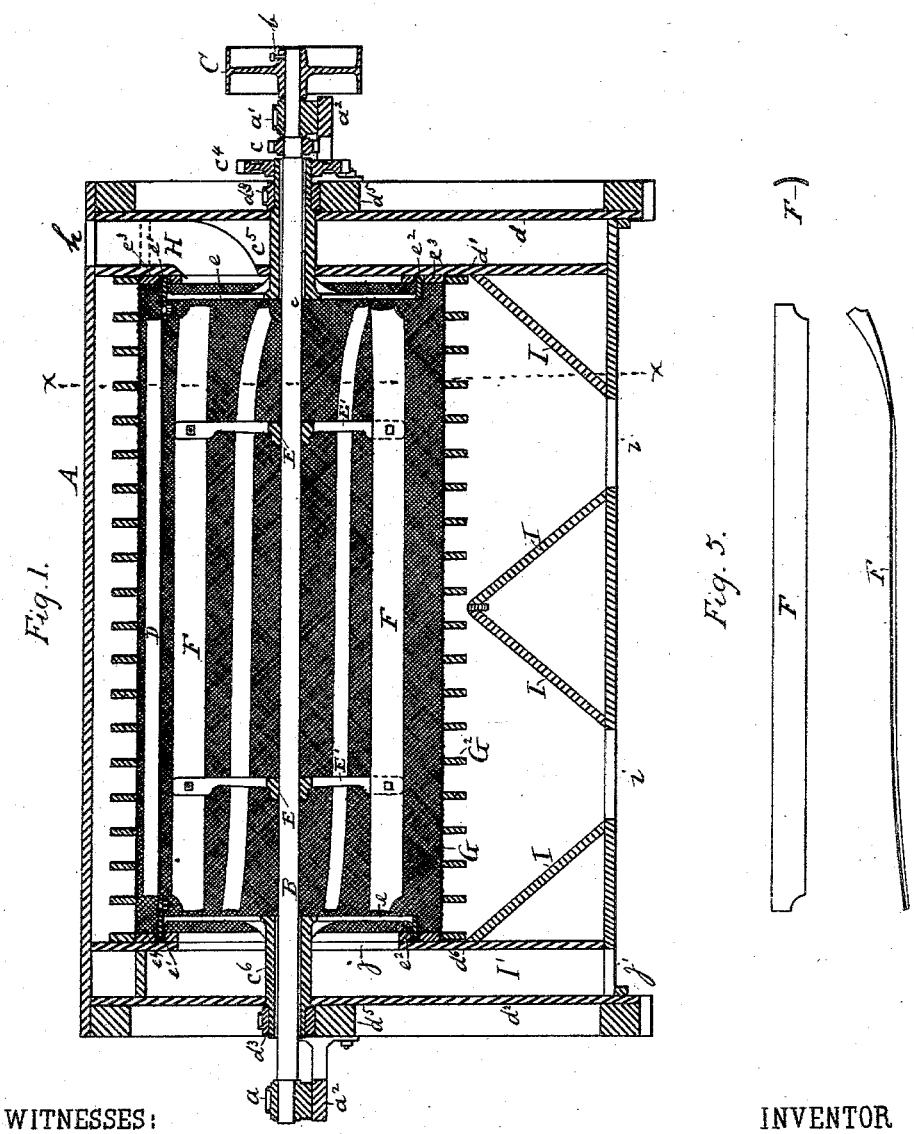
Figure 2:
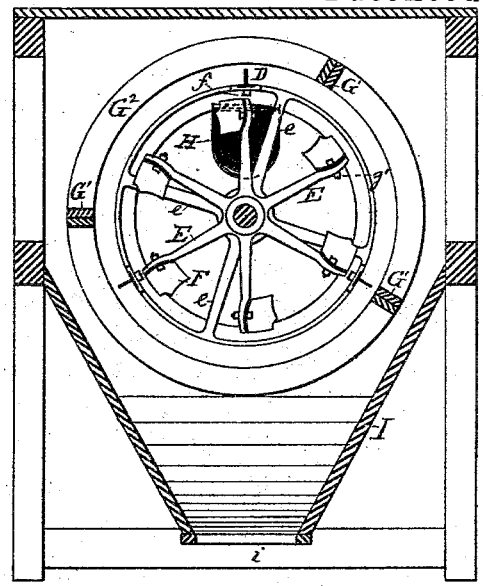
Figure 3:
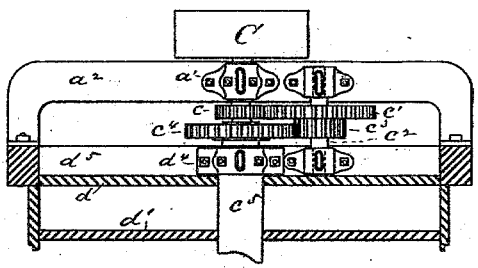
Figure 4:
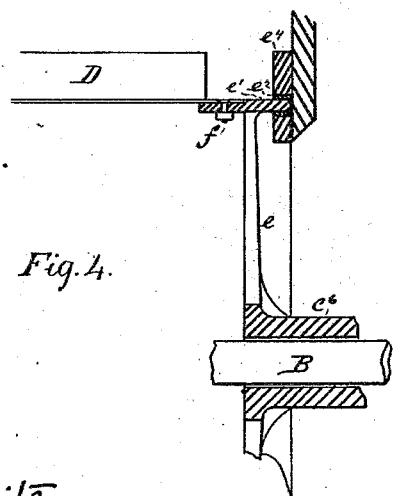

Figure 1 is a vertical section of the machine; Fig. 2, an end section on line $x$ $x$, Fig. 1; Fig. 3, a sectional plan view of parts of the machine; Fig. 4, a section showing certain parts on an enlarged scale, and Fig. 5 views in detail of the revolving beaters or agitators.

The same letters refer to the same or corresponding parts in each of the several views.

A represents the frame of the machine, which is here made rectangular.

B is a shaft which passes through the machine, and protrudes at each end a short distance beyond the ends of the same. At one end, and at a point near the opposite end, this shaft has bearings in blocks $a$ $a'$, which are supported on suitable brackets, $a^2$, secured firmly to the outer face of the frame-work.

Keyed to shaft B, by means of pin $b$ or otherwise, is a pulley, C, by means of which motion is imparted to said shaft.

Secured to shaft B so as to revolve therewith, and at a point between the bearing-block $a'$ and frame of the machine, is a small stud-wheel, $c$, which, in its revolution, meshes with and revolves a larger wheel, $c'$, of the same character, and secured to a stud, $c^2$, as shown in Fig. 3. Mounted upon this stud $c^2$ is a second stud-wheel, $c^3$, of a size corresponding to the one $c$, before referred to. Wheel $c^3$, in its revolution, meshes with and revolves a fourth wheel, $c^4$, secured to a sleeve, $c^5$, and which corresponds in size to the one $c'$, referred to as mounted on stud $c^2$. Sleeve $c^5$ is loosely mounted on shaft B, and has bearings in uprights $d$ $d'$ of frame A, and said sleeve serves as additional bearing at one end of the machine for shaft B.

Loosely mounted on shaft B at a point near its opposite end is another sleeve, $c^6$, which has bearing in an upright, $d^2$. These sleeves are provided with suitable journal-boxes, $d^3$, which are similar to those in common use. Four arms, $e$, radiate from the sleeves $c^5$ $c^6$ as their centers, and form the spokes of wheels, of which $e'$ are the peripheries. Upon the revolution of these sleeves one edge of each of their peripheries moves in a groove, $e^2$, which grooves are formed in circular pieces $e^3$ and $e^4$, secured, respectively, to uprights $d'$ and $d^5$. The inner edges of peripheries $e'$ are connected by the outer set of beaters, D, the parts being joined by means of bolts $f$. The grooves $e^2$, described as being formed in circular pieces $e^3$ and $e^4$, and in which peripheries $e'$ move, are provided with suitable bushing, to lessen the friction.

Secured to shaft B to revolve therewith, and at the points shown, are two hubs, E, which are provided each with six radial arms, E', said arms being formed slightly concave on their outer ends, as shown in Fig. 2. Secured to these arms by means of bolts and nuts $g$ $g'$ are the inner beaters or strips, F. (Shown in detail in Fig. 5.) These beaters or strips are preferably notched and curved, as shown in that figure, and when secured to arms E' rest in the concavities formed on the outer ends thereof. The arms E' are shorter than the ones $e$, radiating from sleeves $c^5$ and $c^6$, and the outer set of beaters secured to the peripheries of said last-named arms revolve about the beaters or strips F. The arms E' and $e$, with their beaters, are all inclosed and revolve within a stationary screen, G, which is secured to three or more cross-pieces, G', as shown, and which is inclosed by a series of segmental strips, $G^2$.

At the top of the machine there is formed an opening, $h$, through which the crushed grain is fed into a spout, H, which is situated between the uprights $d$ and $d'$, and passes through an opening in said upright $d'$, and discharges the crushed grain within the wire screen G.

In the bottom of frame A there are formed openings $i$ $i$, through which the finer particles are discharged after having been thoroughly sifted through screen G. Suitable inclined guiding-boards, I, are provided for directing said finer particles to these openings. Upright $d^6$ is provided with a circular opening, $j$, through which the coarser particles which are found too large to sift through screen G are discharged into space I', formed between said upright $d^6$ and an upright, $d^2$, and thence through an opening, $j'$, to some suitable receptacle.

The gearing hereinbefore described as imparting motion to sleeves $c^5$ and $c^6$ are so arranged and are of such size that the shaft B and parts secured thereto will make about one hundred and fifty revolutions a minute, while the sleeves referred to make about fifty, the proportion being three to one.

The operation of the device is as follows: Motion is imparted to shaft B and to the arms E' and beaters or strips F, mounted thereon, through the medium of pulley C. This, through the medium of wheel $c$, revolves wheels $c'$, $c^3$, and $c^4$, which imparts motion to sleeve $c^5$, and through it to arms $e$, outer set of beaters, D, and sleeve $c^6$, the wheels referred to being of such relative size that the shaft B and its connections will make three revolutions to each one of sleeves $c^5$ and $c^6$ and the parts connected therewith. The crushed grain is then fed through discharge-pipe H to the interior of screen G, and upon entering therein is brought in contact with the inner beaters or strips, F, and outer set of beaters, D, by which it is thoroughly shaken up, the finer particles being separated from the coarser ones, the shape of the strips F, as herein shown, being especially adapted for that purpose. The finer particles are then dropped upon screen G, and are sifted therethrough and guided by boards I to openings $i$, through which they pass to any suitable receptacle. The coarser particles which are too large to pass through the meshes of screen G are gradually carried to the end of the machine and discharged through opening $j$ in upright $d^6$ into space I', and thence, through opening $j'$, into any suitable receptacle provided for that purpose.

My device will be found simple in construction, effective in operation, and durable.

Having thus described my invention, what I claim as new, and desire to secure by Letters Patent, is—

1. The combination of the bolt or screen G, shaft B, and sleeves $c^5$ $c^6$, provided with the radiating arms $e$, having peripheries $e'$, with the circular plates $e^3$ $e^4$, formed with grooves $e^2$, and the outer beaters, D, substantially as described and shown.

2. The bolt or screen G, shaft B, hubs E, radiating arms E', concaved on their outer ends, and beaters or strips F, in combination with the sleeves $c^5$ $c^6$, provided with radiating arms $e$, having peripheries $e'$, circular grooved pieces $e^3$ $e^4$, outer beaters, D, and means for rotating said shaft and the beater-carrying sleeves at different speeds, substantially as described and shown.

In testimony whereof I affix my signature in presence of two witnesses.

FRANZ WILHELM ANDRÉE.

Witnesses:
 M. J. CLAGETT,
 ADAM GEO. WHITE.